Dec. 14, 1937.  L. A. GARDNER ET AL  2,101,995
TELEGRAPH SWITCHING SYSTEM
Filed March 14, 1936  4 Sheets-Sheet 3

INVENTORS: *L. A. GARDNER*
*F. J. SINGER*
BY
*ATTORNEY*

Patented Dec. 14, 1937

2,101,995

UNITED STATES PATENT OFFICE 2,101,995

TELEGRAPH SWITCHING SYSTEM

Leland Adams Gardner, Maplewood, N. J., and Fred John Singer, Rockville Centre, N. Y., assignors to American Telephone and Telegraph Company, a corporation of New York Application March 14, 1936, Serial No. 68,928

9 Claims. (Cl. 178—2)

This invention relates to telegraph switching systems and particularly to automatic switching printing telegraph or teletypewriter systems adapted for stock quotation service.

An object of the invention is to furnish by means of a teletypewriter operator at the stock exchange the latest "bid and asked" prices of any desired stock immediately upon request from a broker at a remote point.

Heretofore it has been necessary for stockbrokers, when desiring the latest "bid and asked" quotations on any stock to call a stock quotation clerk over a private line terminated in a manually operated switchboard located at a stock exchange. The operator at this switchboard, upon request by a calling broker, connects the calling broker to the stock quotation clerk who keeps a record of the "bid and asked" quotations of all stocks. These quotations are obtained from the stock specialists located at each trading post on the floor of the exchange. This arrangement requires considerable time to obtain the desired information and at times, especially during extraordinarily active periods at the exchange, subjects the brokers to considerable annoyance because of errors introduced by human agencies involved in verbally transmitting the information.

According to the present invention the time required to obtain the desired information is greatly reduced and the liability of error due to human agencies is substantially reduced by the elimination of voice transmitted quotations between the stock exchange and the stockbrokers' offices. The present invention provides a system adapted to permit a broker to automatically connect a telegraph sending-receiving printer at his station with a central office in the stock exchange having receiving-only printers equipped with projectors and sending printers for a stock quotation bureau. The operation of a teletypewriter message key at the broker's office causes code symbols of a desired stock to be printed on the tape of an idle printer equipped with a projector system. The symbols as printed on the tape are projected onto a screen in the line of vision of a number of quotation bureau operators whose equipment is arranged for association with any one of a group of printer projectors. A file of the latest "bid and asked" quotations on a particular group of stocks is maintained for each operator. The operator which has these quotations on the stock appearing code, associates a sending printer with the printer projector on which the code appeared and also with the calling broker's printer so that she may transmit the latest "bid and asked" quotation of the desired stock to the calling broker and may also cause the quotation to appear on the tape and screen of the associated printer projector.

The invention will be better understood from the following description taken in conjunction with the drawings in which.

General description

Figure 1:
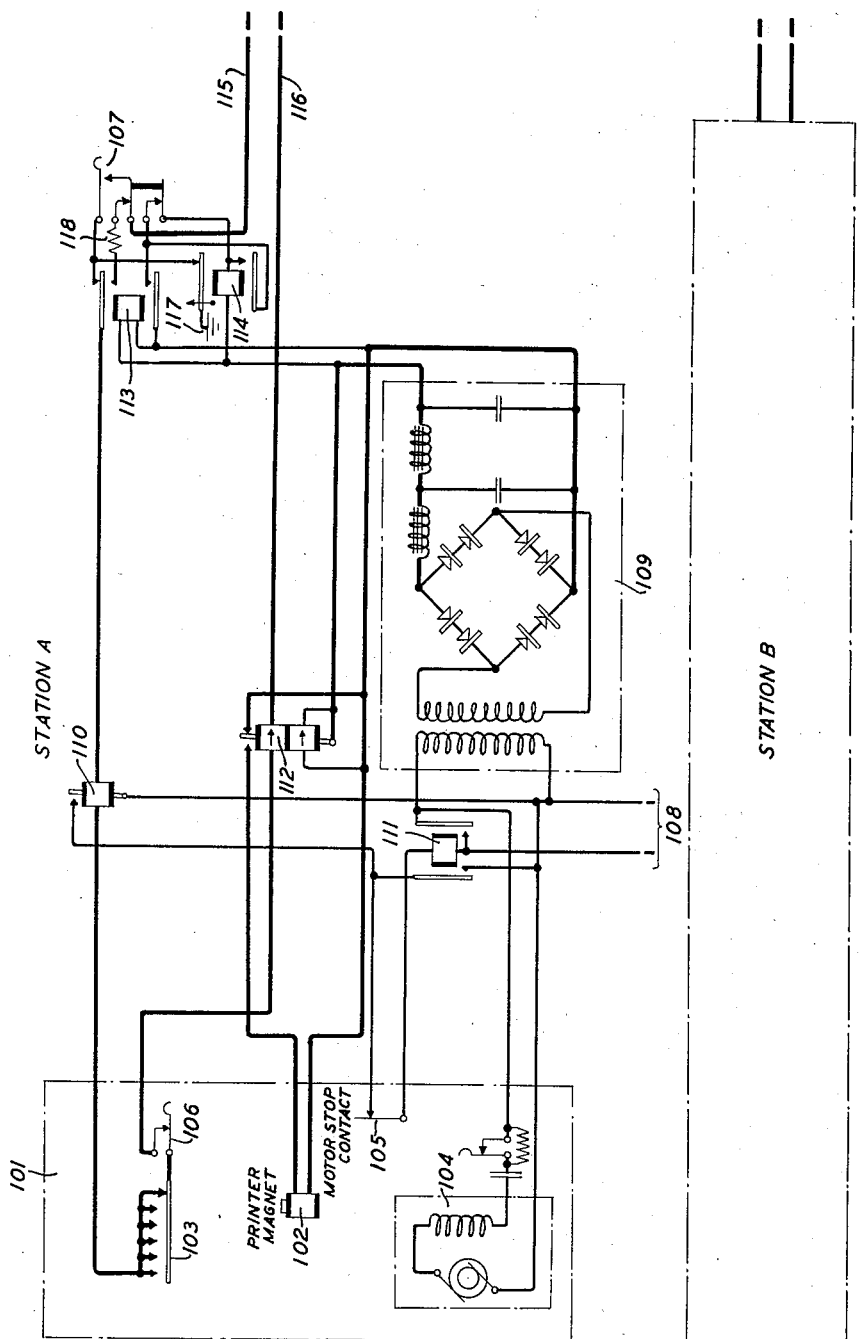
Figure 1 illustrates the equipment in brokers' offices for initiating the call and for transmitting and receiving messages.
Figure 2:
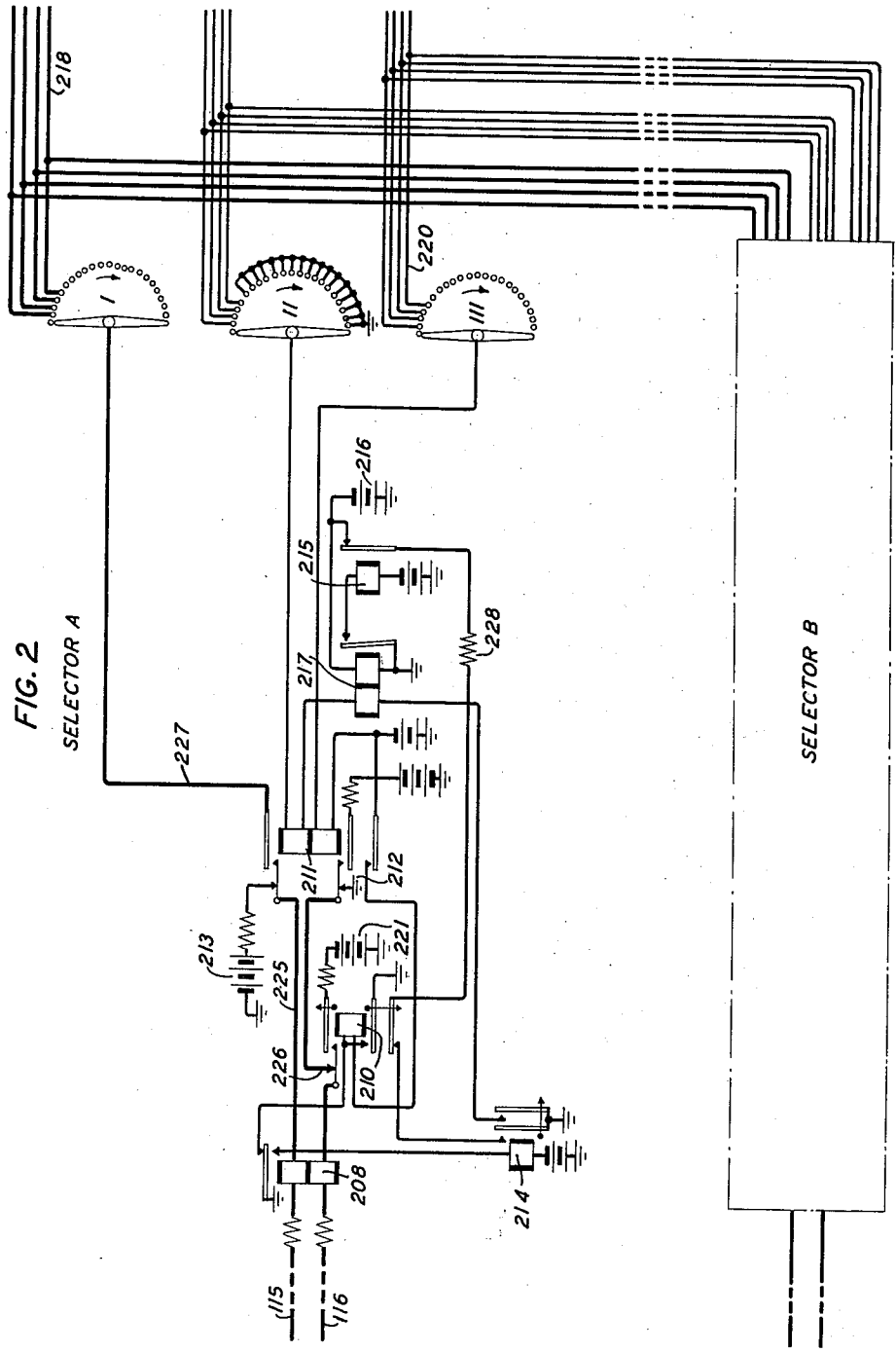
Fig. 2 illustrates a plurality of selector switching circuits in the stock exchange central office arranged to interconnect the station equipment with the central office equipment.
Figure 3:
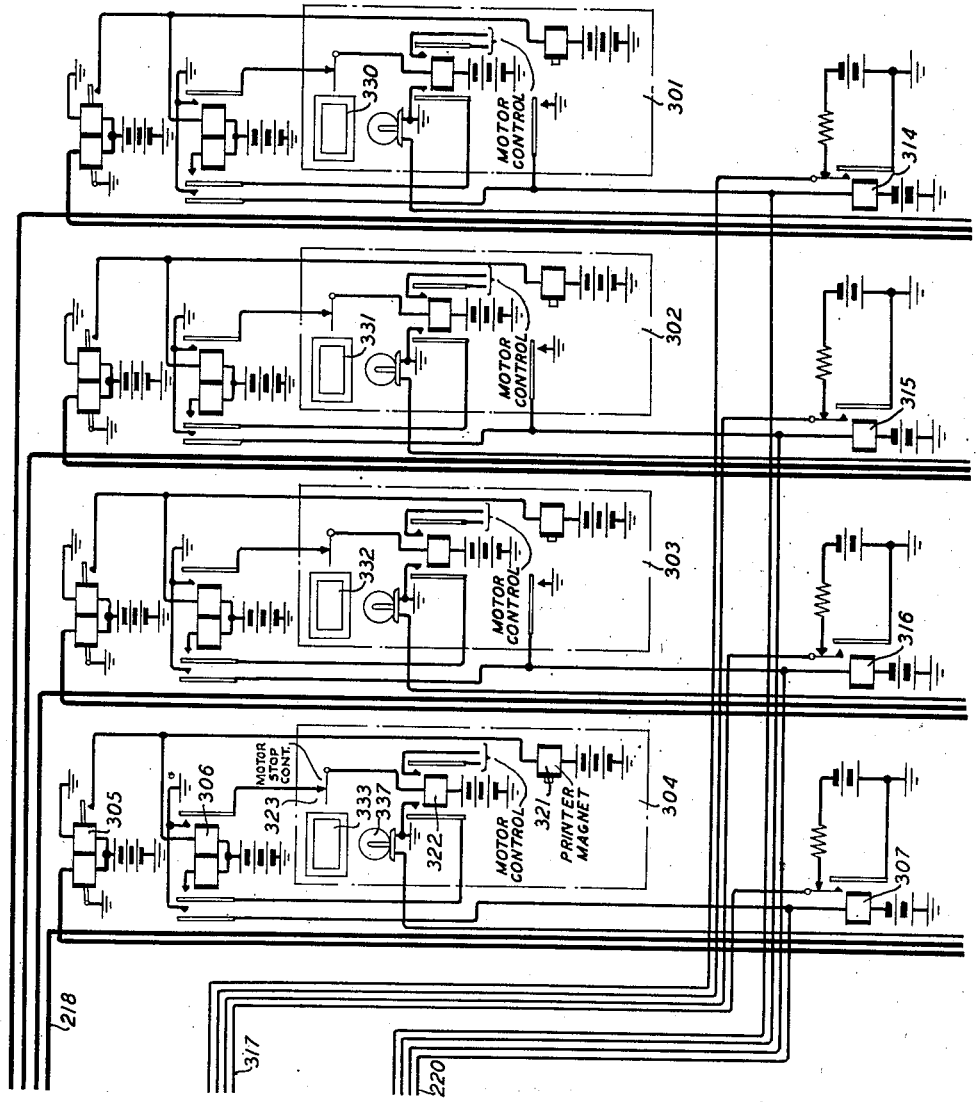
Figs. 3 and 4 illustrate printer projectors and sending printers also in the stock exchange central office.

The circuit arrangement of Fig. 1 is that of an outlying station at a broker's office referred to as station A. The equipment shown therein comprises a printing telegraph sending and receiving unit 101 and calling apparatus. Station B schematically shown, is similar to station A and may be located at a different broker's office. The selector switching circuits A and B of Fig. 2 each include equipment in the central office responsive to the initiation of a call for connecting the broker's office with an idle printer projector Fig. 3 and the sending apparatus of Fig. 4.

Figure 4:
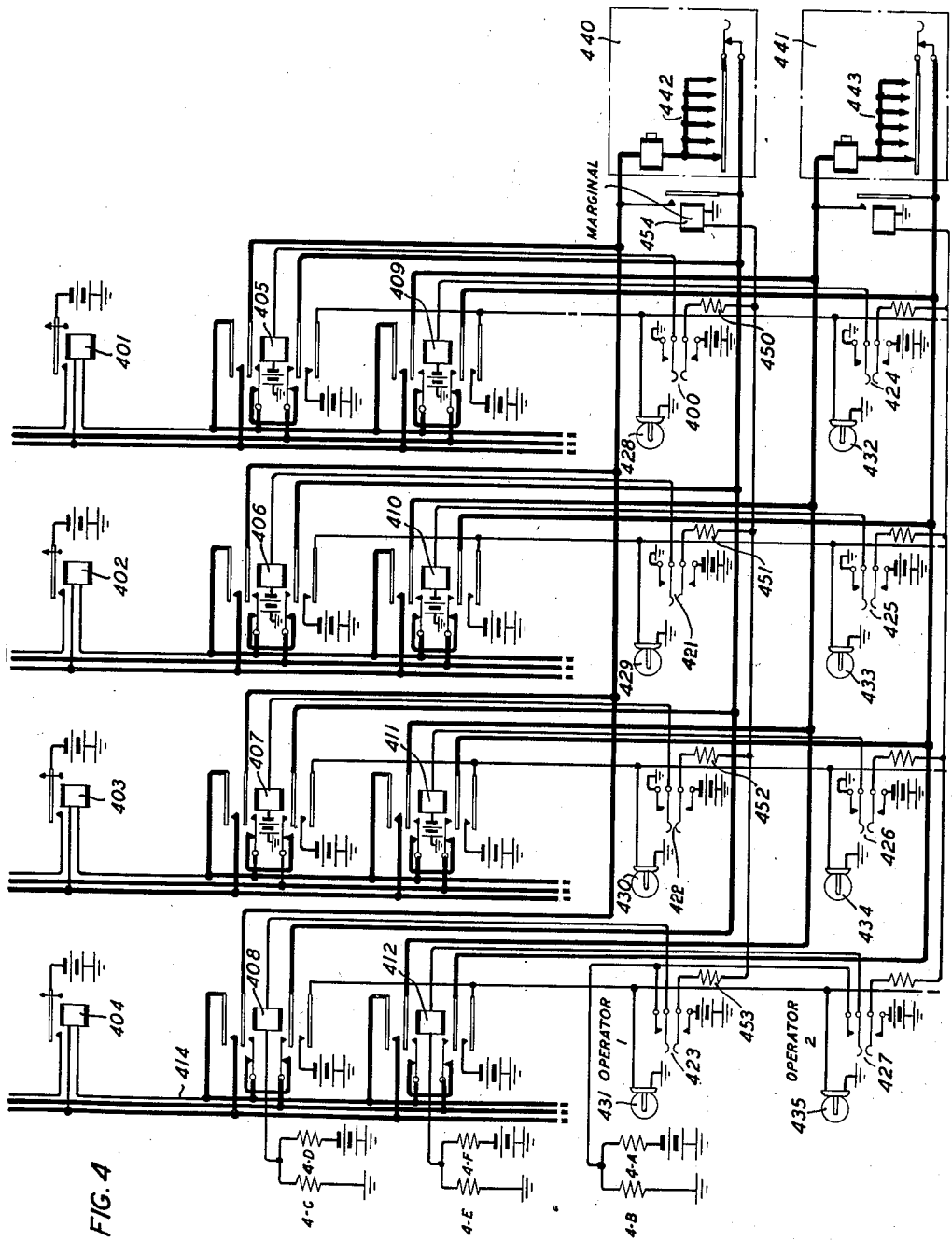

A broker desiring the latest quotation on a particular stock initiates a call and sends a combination of signals representing code letters to indicate the stock on which a quotation is desired. This is accomplished by the operation of key 107 which completes a circuit over a trunk between the broker's office and the central office at the stock exchange for operating the selector shown in Fig. 2. This selector rotates to find an idle printer projector, indicated schematically at 301, 302, 303 and 304. The printer projectors may be of the type disclosed in Patent 2,017,633 to E. T. Mottram, October 15, 1935. The completion of a circuit between the broker's office equipment as shown in Fig. 1, and the central office equipment shown in Figs. 2, 3 and 4, energizes apparatus for starting the motor 104, Fig. 1, and the motor of an idle printer projector Fig. 3. The starting of the motor 104 is a signal to the operator at the broker's office to release key 107 for establishing the sending circuit. The code signals are transmitted by the manipulaiton of the sending contacts 103, and are received by the idle printer projector selected by the switch shown in Fig. 2. The code letters are immediately displayed on a screen, such as 330, 331, 332, or 333, depending upon the printer projector selected. All of the screens are positioned within the vision of all of the operators. The apparatus for two operators' positions is shown in Fig. 4. These operators have available at all times the latest quotations on stocks, each operator having a particular group of stocks to handle. When a stock code appears upon the screen, an operator actuates a sending key, such as 400, 421, 422, or 423 shown in the operator's position 1. Assuming that printer projector 304 has been selected and that the code appearing on the screen 333 represents a stock handled by operator No. 1, key 423 is operated to associate the apparatus of position No. 1 with the apparatus of projector 304 and the broker's station A. A signal light is lighted at each operator's position to indicate that the call has been taken. The quotation is given by the manipulation of the sending contacts of printer 440. When the quotation has been transmitted and received by the broker, the apparatus is disconnected. This stops the operation of the printer motors and restores all apparatus to normal.

*Detail operation of the system*

Having briefly discussed the general operation and structure of the system between the broker's station and the central office in the stock exchange, the manner in which the circuits and switching contacts are established will now be described in detail.

It may be assumed that the broker at Station A desires to establish a connection in the central office for obtaining a quotation on a particular stock. Call key 107 is operated and establishes a circuit from ground 117 through the contact of relay 114 and the key contact to the tip conductor 115, thence through the upper winding of relay 208, upper make-before-break contact of relay 211 to positive signal battery 213. Relay 208 operates and connects ground to the circuit extending through the winding of relay 214 to battery. Relay 214 which is of the slow release type, operates and applies ground at its inner armature and contact to a circuit extending over the contact and lower outer armature of relay 210, resistance 228, armature and contact of stepping magnet 215 to battery 216. Relay 217 is normally held operated by the circuit extending from ground through its right-hand winding to battery. The application of ground to the stepping magnet armature reduces the current through the right winding of relay 217 below its holding value and causes the latter relay to release. It will be noted that a second circuit was established by the operation of relay 214 from ground through its right outer armature and contact, left winding of relay 217, upper winding of relay 211 to the wipers on bank 2 of switch S. This circuit is completed as the switch rotates as will be described hereinafter. The release of relay 217 causes the stepping magnet 215 to operate over an obvious circuit from ground, through the contact of relay 217, stepping magnet 215 to battery. The energization of this magnet moves the wipers on banks 1, 2 and 3 of the stepping switch S one step to their respective second contacts. The energization of the stepping magnet opens the contact at its armature which removes the short circuit from the right-hand winding of relay 217 thereby causing relay 217 to reoperate. The selector circuit switch is now seeking an idle printer projector. The idle or busy condition of a printer may be briefly referred to at this time as indicated by battery or ground on the contacts of relays 314, 315, 316 and 307 connected to switch bank 2. Battery on the contacts indicates that the printer is idle and ground indicates that the printer is busy. Assuming that ground is encountered on the contact of relay 314, no circuit is established for holding relay 217 operated through its left winding. Relay 217 is therefore released as soon as the armature of the stepping magnet is restored and the stepping magnet 215 is again energized causing the wipers to move to contact 3. This action continues until an idle printer is found. Let it be assumed that printers 301, 302 and 303 are busy and that printer 304 is idle. Under this condition the switch wipers are arrested upon the fifth contact and a circuit is established from battery on the make-before-break contact of relay 307, conductor 317, fifth contact of bank 2 and its associated wiper, through the upper winding of relay 211, the left-hand winding of relay 217 to ground at the outer armature of relay 214. At the time that this circuit is established, the magnet contact is opened and relay 217 released. Relay 217 is, therefore, operated through either its left or right winding or both, and held operated through its left winding after the switch magnet contact is restored to normal. The switch wipers therefore remain connected to the fifth contact. The holding circuit for relay 217 previously traced also operates relay 211, thereby removing ground at the lower make-before-break contact of relay 211 and applying positive signal battery to conductor 226 extending through the upper contact of relay 210, lower winding of relay 208, conductor 116, upper winding of relay 112, closed contact of key 106, transmitting contacts 103, winding of relay 110, upper contact of relay 113, contact of relay 114, to ground 117. Relays 110 and 112 at station A operate when this circuit is established. Relay 110, in operating, closes a circuit extending from one side of the alternating current power supply 108, through the winding of relay 111, motor stop contact 105, armature and contact of relay 110 to the opposite side of the power supply. Relay 111 operates and, at its left-hand contact and armature, closes a locking circuit for itself by omitting the contact of relay 110 from the circuit traced. Relay 111 also closes at its right-hand armature and contact a circuit for operating the motor and a circuit for energizing the rectifier 109. The rectified current operates relay 113 and energizes the printer magnet 102. The rectified current flowing through the lower winding of relay 112 is in such direction and of such strength as to hold the armature in the position shown when an operating circuit is not established through its upper winding. When a circuit is established through the upper winding of relay 112, the magnetism of the lower winding is overcome and the relay operated in the opposite direction.

It will be remembered that relay 211 operated when printer 304 was selected. A circuit is thus closed extending from positive signal battery, through the left-hand winding of polar relay 305, winding of relay 404, inner contact of relays 408–412, conductor 218, fifth contact and wiper of bank 1, upper contact of relay 211, upper winding of relay 208, tip conductor 115, contact of key 107 to ground 117 through the contact of relay 114. Relay 305 is electrically biased through its right winding to spacing and when no line current is connected to it, its armature lies in the position shown. When a circuit is established as traced through its left-hand winding, the current is sufficient to overcome the biasing current and causes the operation of relay 305 to establish a circuit for the operation of the printer magnet 321 and relay 306. Relay 306, in operating, closes at its right-hand armature an operating circuit for the motor control relay 322 which starts the motor of printer 304 and establishes a locking circuit for relay 306. Relay 306 through its left outer contact establishes an operating circuit for relay 307, and a holding circuit for relay 211 through the switch contact and wiper 3, lower winding of relay 211 to battery. The operation of relay 307 connects ground through its contact to the switch contact of bank 2 which establishes a busy condition to prevent other selector switches from seizing the printer 304.

The foregoing operations take place in response to the operation of the key 107. The motor control circuits for the printers 101 and 304 are approximately simultaneously established. The starting of the motor in the printer 101 is a signal to the broker's station operator to release key 107. It will be remembered that relay 113 was operated by the rectified current and thus upon the release of key 107 a circuit is established for slow release relay 114 and a loop circuit is established through the upper contact of relay 113. The operation of relay 114 removes ground from the signaling circuit for disconnect purposes which will be discussed later. The loop circuit established by the release of key 107 may be traced from positive battery at the lower inner contact of relay 211, upper contact of relay 210, lower winding of relay 208, ring conductor 116, upper winding of relay 112, closed contact 106, transmitting contacts 103, winding of relay 110, upper contact of relay 113, contact of key 107, tip conductor 115, upper winding of relay 208, upper contact of relay 211, wiper and contact of bank 1, conductor 218, inner contacts of relays 408 and 412, winding of relay 404, left winding of relay 305 to positive battery. Positive batteries are now connected to the opposite ends of the loop circuit which extends through the upper and lower winding of relay 208 which causes the release of latter relay. Relay 214 releases which at this time does not affect other apparatus since holding circuits have been established for both relays 217 and 211. The release of relay 208 establishes an operating circuit for relay 210 from ground, through the winding of relay 210, make contact of relay 211 to battery.

The operation of relay 210 establishes an obvious locking circuit for itself and establishes a loop circuit for sending signals from the station printer to the central office printer projector. This loop circuit may be traced from negative signal battery 221, upper contact of relay 210, lower winding of relay 208, conductor 116, upper winding of relay 112, contacts 106 and 103, winding of relay 110, upper contact of relay 113, resistance 118, conductor 115, upper winding of relay 208, conductor 225, upper contact of relay 211, conductor 227, switch bank 1, contacts of relays 408 and 412, conductor 414, winding of relay 404, winding of relay 305 to positive battery. Relay 208 again operates and this operation for obvious reasons has no effect upon the operation of the system at this time. Relay 404 operates and establishes an obvious circuit for lighting lamp 337 to indicate that printer 304 has been selected for a code message.

A code message is transmitted over the loop circuit last established by the manipulation of the sending contacts 103. Relays 112 and 305 are responsive to the message signal impulses transmitted over the loop. Relay 305 operates printer magnet 321 for printing the code signal upon the tape, which signal is reflected upon the projector screen 333. The operation of relay 112 is effective for operating the printer magnet 102 so that a home record may be had of the transmitted message. Relay 110 is also responsive to the signal impulses transmitted but has no effect on the power supply to the motor 104 because relay 111 is locked over its left-hand armature.

There may be as many operators' positions as required such as positions 1 and 2 illustrated in Fig. 4. Each position is equipped with message keys and signal lamps individual to each printer projector and one sending printer. Assuming that operator No. 1 takes the call appearing in code on the screen 333 the message key 423 is operated for associating the No. 1 position printer 440 with the loop circuit. The operation of key 423 establishes a circuit for operating the position relay 408 from a circuit established through its winding from potentiometer 4A—4B to potentiometer 4C—4D. A second circuit is established from battery through the lower contact of key 423, resistance 453, winding of marginal relay 454 to ground. Relay 454 is used only as safety apparatus to prevent incorrect operation of printer apparatus if two keys such as 422 and 423 are accidentally operated at the same time. The current through the one resistance 453 is not sufficient to operate the marginal relay but when two keys are operated the current through two resistances in parallel such as 453 and 452 causes sufficient current to flow through the winding of relay 454 to cause its operation. The operation of this relay places a shunt around the printer contacts 442 so that a message cannot be sent under this condition. A similar safety device is shown in the use of the potentiometers such as 4A—4B, 4C—4D and 4E—4F. If the No. 1 key in operator's position No. 1 remains operated after a call has been answered and the No. 1 key of operator's position No. 2 is operated, insufficient current will flow through the winding of relay 412 to cause its operation due to the value of the resistances in each potentiometer. It is apparent that under this condition the two potentiometers 4C—4D and 4E—4F and the windings of two relays are in multiple extending to a common potentiometer 4A—4B through the key contacts. It will be assumed that only key 423 is actuated and operates relay 408 to establish an obvious circuit through its lower outer contact for lighting lamps 431 and 435 in operators' positions 1 and 2. If there are more positions the lamps are lighted in all of the positions to indicate that the call appearing on screen 333 is being cared for. The upper outer contact of relay 408 places a shunt around the winding of relay 404 which causes its release to extinguish lamp 337. The upper and lower inner make contacts of relay 408 establish a loop circuit for the printer 440. This circuit may be traced from positive battery through the left winding of relay 305, upper outer contacts of relay 408, upper inner contacts of relay 408, magnet and sending keys of printer 440, lower inner contact of relay 408, conductor 218, fifth contact and wiper of selector switch bank 1, conductor 227, upper contact of relay 211, conductor 225, upper winding of relay 208, conductor 115, normal contact of key 107, contact of relay 113, winding of relay 110, printer contacts 103 and 106, upper winding of relay 112, conductor 116, upper contact of relay 210 to negative battery. The stock quotation is given by operator No. 1 by manipulation of the keys of printer 440 and the quotation is received on printer 101 and printer projector 304. The quotation transmitted appears on screen 333 and may be checked by the operator. The complete circuit may therefore now be released.

*Disconnection*

The position operator No. 1 may release the connection by the transmission of a double shift signal or upper case H which disconnects the apparatus in successive steps and shuts down the motors of printer 101 and printer 304. The operator's key 423 is now restored to normal which releases relay 408 and disconnects the position apparatus from the sending loop. The transmission of the double shift signal or upper case H opens the motor stop contacts 323 and 105. Each of these contacts is normally held closed substantially in the manner shown in Patent 1,566,295 to E. F. Watson, December 22, 1925 or Patent 1,904,164 to S. Morton et al, April 18, 1933 and may be opened as shown in these patents. The opening of contact 323 releases relay 322 which opens the right-hand motor control contacts and the left-hand holding circuit for relay 306. The latter relay releases and opens the holding circuit for relay 211 and the operating circuit for the make-busy relay 307. This removes the make-busy ground from the switch contact which permits the printer projector 304 to be again seized by another selector. It will be remembered that the locking circuit for relay 210 is established through the lower contact of relay 211 and upon the release of relay 211 relay 210 releases. The loop extending to the apparatus of Fig. 1 is thus open which causes the apparatus of Fig. 1 to restore to normal. Attention is directed to the function of relay 114 which is used to prevent the broker at station A from holding the connection between his office and a printer projector.

The connection could be held by the reoperation of key 107 immediately after the quotation has been received at the station if the start loop circuit were not held open by the upper contact of relay 114. To prevent the release of relay 114 by the reoperation of key 107 a locking circuit is established through the lower contacts of relays 113 and 114. Upon the release of relay 113 the circuit is opened for relay 114 but since this relay is slow to release, sufficient time is allowed to permit all of the apparatus used in the connection to restore to normal before the ground 117 is again associated with key 107.

In some instances it may be an advantage to have the operator at the broker's office assume the duty of transmitting the disconnect signal after the stock quotation has been received. In this case the apparatus of both the station and central office is restored to normal in the same manner as described.

What is claimed is:

1. In a signal transmission switching system, the combination of a plurality of sending stations, means at said sending station for transmitting outgoing signals and recording incoming signals, a plurality of receiving stations, a signal printer at each receiving station, a plurality of transmitting printers common to said receiving stations, a device individual to each of said sending stations for selecting any one of said signal printers, a normally deenergized circuit extending from each of said sending stations to each of said devices, an electrical contacting device at each sending station operable for energizing one of said circuits and causing the associated selecting device to select an idle signal printer at one of said receiving stations, indicating means individual to each of said signal printers and visible to the operators of all transmitting printers for informing the operators that a sending station has been connected to an idle signal printer and that certain information is requested by the operator at the sending station whereat the call is initiated, a plurality of means associated with each of said transmitting printers for respectively connecting the transmitting printer to any one of said circuits, and means in each of said transmitting printers for transmitting the desired information over the operated circuit to the operator at the calling sending station.

2. In a signal transmission switching system, according to claim 1, wherein the transmitting printers are normally disconnected from said circuit and said signal printers, and the means for connecting said transmitting printers to any one of said signal printers and any one of said circuits is any one of a plurality of electromagnets respectively responsive to the operation of a plurality of manually operated elements associated with each of the transmitting printers.

3. A two-way printer transmitting system comprising a plurality of sending-receiving printer stations and a central office having a plurality of selector switches, a plurality of receiving printer projectors each having a projector screen and means for displaying the printed matter on the screen and a plurality of sending printers, means in each sending-receiving printer station for initiating the operation of a selector for selecting an idle receiving printer projector and establishing a signal transmitting loop, means including the printer in said station for transmitting a code signal to the selected projector, said code signal appearing on the screen of the projector, means in the central office for associating a sending printer with the projector selected and for establishing a sending loop between said sending printer and the calling station printer, and means including the associated sending printer for sending informatory signals to the station in response to the code signal appearing on the projector screen.

4. A two-way printer transmitting system comprising a plurality of sending-receiving printer stations and a central office having a plurality of selector switches, a plurality of receiving printer projectors each having a projector screen and means for displaying the printed matter on the screen and a plurality of sending printers, means in each sending-receiving printer station for initiating the operation of a selector for selecting an idle receiving printer projector and establishing a signal transmitting loop, means operated by said selection for energizing the motor start magnets of the station and projector printers, means including the printer in said station for transmitting a code signal to the selected projector, said code appearing on the screen of the projector, means in the central office for associating a sending printer with the projector selected and for establishing a sending loop between said sending printer and the calling station printer, means including the associated sending printer for sending informatory signals to the station in response to the code signal appearing on the projector screen, and means for disconnecting said sending-receiving loop and arresting the operation of the printer motors.

5. A two-way printer transmitting system comprising a plurality of sending-receiving printer stations and a central office having a plurality of printer projectors, a plurality of selector switches for selecting idle printer projectors, and a plurality of sending printers, means in each station for initiating the operation of the selector switches and establishing a signal transmitting loop, means including the station printer for transmitting signals to the selected printer projector, means in said projector for displaying the signal printed, means in the central office for associating a sending printer with the selected printer projector and the station, means including the associated sending printer for sending informatory signals and a disconnect signal to the connected station, and means responsive to said disconnect signal to prevent the initiation of another call previous to the restoration of the station and central office apparatus involved in the connection.

6. A two-way printer transmitting system comprising a plurality of sending-receiving printer stations and a central office having a plurality of printer projectors, a plurality of selector switches for selecting idle printer projectors, and a plurality of sending printers, means in each station for initiating the operation of the selector switches and establishing a signal transmitting loop, means including the station printer for transmitting signals to the selected printer projector, means in said projector for displaying the signal printed, means in the central office for associating a sending printer with the selected printer projector and the station, a plurality of operators' positions in said central office each having connecting apparatus individual to each printer projector, and safety means to prevent the connection of two of said apparatus to the same printer projector.

7. A two-way printer transmitting system comprising a plurality of sending-receiving printer stations and a central office having a plurality of printer projectors, a plurality of selector switches for selecting idle printer projectors, and a plurality of sending printers, means in each station for initiating the operation of the selector switches and establishing a signal transmitting loop, means including the station printer for transmitting signals to the selected printer projector, means in said projector for displaying the signal printed, means in the central office for associating a sending printer with the selected printer projector and the station, a plurality of operators' positions in said central office each having connecting apparatus individual to each printer projector, and safety means to prevent the connection of two of said apparatus in one position to different printer projectors at the same time.

8. A two-way printer transmitting system comprising a plurality of sending-receiving printer stations and a central office having a plurality of printer projectors, a plurality of selector switches for selecting idle printer projectors, and a plurality of sending printers, means in each station for initiating the operation of the selector switches and establishing a signal transmitting loop, means including the station printer for transmitting signals to the selected printer projector, means in said projector for displaying the signals printed, means in the central office for associating the central office sending printer with the printer of the station which established the loop, and means including the associated sending printer for sending informatory signals to said station printer as requested according to the signals displayed.

9. A two-way printer transmitting system comprising a plurality of sending-receiving printer stations and a central office having a plurality of printer projectors, a plurality of selector switches for selecting idle printer projectors, and a plurality of sending printers, means in each station for initiating the operation of the selector switches and establishing a signal transmitting loop, means including the station printer for transmitting signals to the selected printer projector, means in said projector for displaying the signals printed, means in the central office for associating a sending printer with the selected printer projector and the printer of the station which established the loop, and means including the associated sending printer for sending signals to the station printer in response to the signals displayed and to the selected printer projector for displaying the informatory signals.

LELAND ADAMS GARDNER.
FRED JOHN SINGER.